United States Patent
Lee et al.

(10) Patent No.: US 12,418,093 B2
(45) Date of Patent: Sep. 16, 2025

(54) ELECTRONIC DEVICE AND OPERATING METHOD OF ELECTRONIC DEVICE

(71) Applicant: Samsung Electronics Co., Ltd., Suwon-si (KR)

(72) Inventors: Gangminh Lee, Suwon-si (KR); Hyunseok Yu, Suwon-si (KR); Dongwook Lee, Suwon-si (KR); Jeongtaek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 18/383,189

(22) Filed: Oct. 24, 2023

(65) Prior Publication Data

US 2024/0154294 A1 May 9, 2024

(30) Foreign Application Priority Data

Nov. 4, 2022 (KR) .................. 10-2022-0146368
Feb. 13, 2023 (KR) .................. 10-2023-0018982

(51) Int. Cl.
*H01Q 21/29* (2006.01)
*H01Q 1/22* (2006.01)

(52) U.S. Cl.
CPC .......... *H01Q 1/225* (2013.01); *H01Q 1/2225* (2013.01); *H01Q 21/293* (2013.01)

(58) Field of Classification Search
CPC .... H01Q 1/225; H01Q 1/2225; H01Q 21/293; H04W 52/367; H04W 52/42
See application file for complete search history.

(56) References Cited

U.S. PATENT DOCUMENTS

2016/0248496 A1 8/2016 Bellamkonda et al.
2020/0015171 A1* 1/2020 Nadakuduti ........ H04W 52/367
(Continued)

FOREIGN PATENT DOCUMENTS

CN         113573390 A    10/2021
KR     1020220088263 A     6/2022
(Continued)

OTHER PUBLICATIONS

Degirmenci Elif et al: "Assessment of Compliance With RF EMF Exposure Limits: Approximate Methods for Radio Base Station Products Utilizing Array Antennas With Beam-Forming Capabilities", IEEE Transactions On Electromagnetic Compatibility, IEEE Service Center , New York , NY, US, vol. 58, No. 4, Jul. 22, 2016 (Jul. 22, 2016), pp. 1110-1117, XP011617785, ISSN: 0018-9375, DOI: 10.1109/TEMC.2016.2550611 [retrieved on Jul. 27, 2016].

(Continued)

*Primary Examiner* — Awat M Salih
(74) *Attorney, Agent, or Firm* — Muir Patent Law, PLLC

(57) ABSTRACT

According to an aspect of the inventive concept, an electronic device includes a transmitter including a plurality of antennas, and a communication processor for calculating a total exposure ratio (TER) value of each of the plurality of antennas, wherein the communication processor includes an antenna index buffer for storing a used antenna index, which is an index of one or more used antennas from among the plurality of antennas used in each window, a used power buffer for storing used power of an antenna corresponding to the used antenna index, and a controller configured to calculate the TER value based on the used antenna index, the used power, and an influence matrix.

20 Claims, 11 Drawing Sheets

(56) References Cited

U.S. PATENT DOCUMENTS

| | | |
|---|---|---|
| 2020/0195290 A1 | 6/2020 | Khawand et al. |
| 2021/0321340 A1 | 10/2021 | Krenz et al. |
| 2022/0070796 A1 | 3/2022 | Nadakuduti et al. |
| 2022/0086771 A1 | 3/2022 | Lu et al. |
| 2022/0116949 A1 | 4/2022 | Nadakuduti et al. |
| 2022/0159582 A1 | 5/2022 | Lu et al. |
| 2022/0303912 A1 | 9/2022 | Meshkati et al. |
| 2022/0345168 A1 | 10/2022 | Haj et al. |
| 2023/0292255 A1 | 9/2023 | Lee et al. |

FOREIGN PATENT DOCUMENTS

| | | | |
|---|---|---|---|
| WO | 2020010232 A1 | | 1/2020 |
| WO | WO-202109107 | * | 5/2021 |

OTHER PUBLICATIONS

Extended European Search Report for corresponding Application No. EP 23206756.1 dated Feb. 28, 2024.

Nicholas Perentos et al: "Exposure Compliance Methodologies for Multiple Input Multiple Output (MIMO) Enabled Networks and Terminals", IEEE Transactions on Antennas and Propagation, IEEE, USA, vol. 60, No. 2, Feb. 3, 2012 (Feb. 3, 2012), pp. 644-653, XP011403481, ISSN: 0018-926X, DOI: 10.1109/TAP.2011.2173453.

Issa Elfergani, et. al., "Low-Profile and Closely Spaced Four-Element MIMO Antenna for Wireless Body Area Networks," Electronics 2020, 9, 258.

* cited by examiner

ELECTRONIC DEVICE AND OPERATING METHOD OF ELECTRONIC DEVICE

CROSS-REFERENCE TO RELATED APPLICATIONS

This application is based on and claims priority under 35 U.S.C. § 119 to Korean Patent Application Nos. 10-2022-0146368, filed on Nov. 4, 2022, and 10-2023-0018982, filed on Feb. 13, 2023, in the Korean Intellectual Property Office, the disclosures of each of which are incorporated by reference herein in their entireties.

BACKGROUND

The inventive concept relates to an electronic device that sets transmit power based on used power.

Electronic devices may transmit radio frequency (RF) signals through an antenna in order to communicate with other devices. Electromagnetic waves of RF signals transmitted through an antenna may have a harmful effect on the human body. In order to reduce the harmful effects of such electromagnetic waves, authorized organizations regulate a total exposure ratio (TER) value measured when an electronic device transmits an RF signal. Therefore, when an electronic device transmits an RF signal, the TER value regulation condition must be satisfied.

At this time, in order for the electronic device to satisfy the TER value regulation condition, transmit power of the RF signal must be reduced. Such a decrease in transmit power may cause a decrease in communication performance of the electronic device. Therefore, it is desirable to develop a method capable of satisfying TER value regulation conditions while minimizing a decrease in communication performance of an electronic device.

SUMMARY

The inventive step provides an electronic device capable of providing optimal communication performance while satisfying total exposure ratio (TER) value regulation conditions.

According to an aspect of the inventive concept, an electronic device includes a transmitter including a plurality of antennas, and a communication processor configured to calculate a total exposure ratio (TER) value of each of the plurality of antennas. The communication processor includes an antenna index buffer configured to store a used antenna index, which is an index of one or more used antennas from among the plurality of antennas used in each window of a plurality of windows in a TER measurement interval, a used power buffer configured to store used power of an antenna corresponding to the used antenna index, and a controller configured to calculate the TER value based on the used antenna index, the used power, and an influence matrix, wherein the influence matrix includes a plurality of influence coefficients R (i, j), each of which represents a degree of influence of exposure caused by a radio frequency (RF) signal transmission of an ith antenna on a jth antenna, and wherein i and j are integer numbers equal to a number of the plurality of antennas.

According to an embodiment of the inventive concept, a method of operating an electronic device, which includes a transmitter including a plurality of antennas, and a communication processor for calculating a total exposure ratio (TER) value of each of the plurality of antennas, includes storing a used antenna index, which is an index of one or more used antennas from among the plurality of antennas used in each window of a plurality of windows in a TER measurement interval, storing used power of an antenna corresponding to the used antenna index, calculating the TER value based on the used antenna index, the used power, and an influence matrix, wherein the influence matrix includes a plurality of influence coefficients R (i, j), each of which represents a degree of influence of exposure caused by an RF signal transmission of an ith antenna on a jth antenna, and wherein i and j are integer numbers equal to a number of the plurality of antennas, calculating transmit power limit of the one or more used antennas to be used in a setting target window after the TER measurement interval based on the TER value, and setting transmit power of the one or more used antennas based on the transmit power limit of the one or more used antennas.

According to an embodiment of the inventive concept, an electronic device includes a transmitter including a plurality of antennas, and a communication processor configured to calculate a total exposure ratio (TER) value of each of the plurality of antennas and set transmit power of one or more used antennas from among the plurality of antennas. The communication processor includes an antenna index buffer configured to store a used antenna index, which is an index of the one or more used antennas used in each window, a used power buffer configured to store used power of an antenna corresponding to the used antenna index, and a controller configured to calculate the TER value based on the used antenna index, the used power, an influence matrix, and the number of the one or more used antennas, wherein the influence matrix includes a plurality of influence coefficients R (i, j), each of which represents a degree of influence of exposure caused by an RF signal transmission of an ith antenna on a jth antenna, and wherein i and j are integer numbers equal to a number of the plurality of antennas, calculate transmit power limit of the one or more used antenna to be used in a setting target window based on the TER value, and set transmit power of the one or more used antennas based on the transmit power limit of the one or more used antennas.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept are described in detail with reference to the accompanying drawings.

Figure 1:
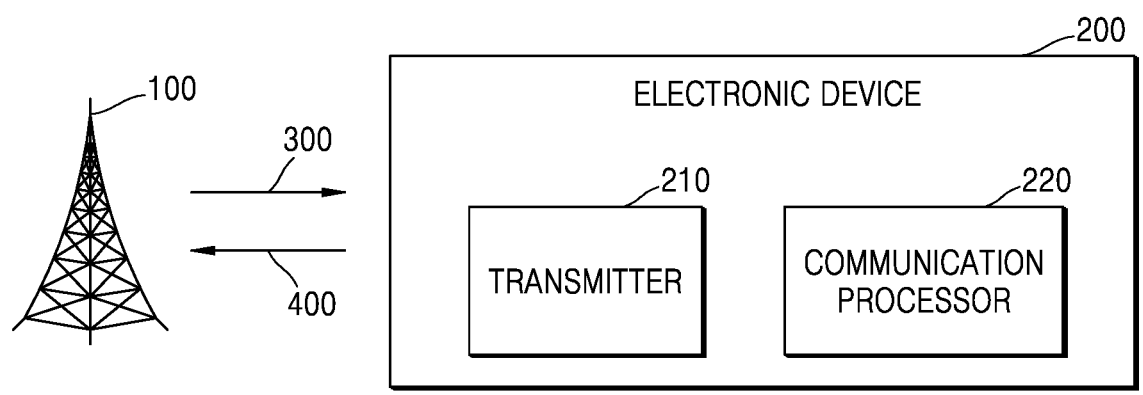
FIG. 1 is a diagram illustrating a wireless communication system including an electronic device according to an embodiment.

FIG. 1 is a diagram illustrating a wireless communication system including an electronic device according to an embodiment.

Referring to FIG. 1, the wireless communication system may include a base station 100 and an electronic device 200. The base station 100 and the electronic device 200 may communicate with each other through a downlink channel 300 and an uplink channel 400.

The base station 100 may generally refer to a fixed station communicating with the electronic device 200 and other base stations and may exchange data and control information with other base stations by communicating with the electronic device 200 and other base stations. The base station 100 may also be referred to as a node B, an evolved-Node B (eNB), a base transceiver system (BTS), or an access point (AP).

The electronic device 200 is a device capable of performing wireless communication, may be fixed or mobile, and may be any one of various devices capable of transmitting and receiving data and control information to and from the base station 100 by communicating with the base station 100. The electronic device 200 may also be referred to as terminal equipment, a mobile station (MS), a mobile terminal (MT), a user terminal (UT), a subscriber station (SS), a wireless device, a handheld device, or the like.

A wireless communication network between the base station 100 and the electronic device 200 may support communication of a plurality of users by sharing available network resources. For example, in a wireless communication network, information may be delivered in various ways, such as code division multiple access (CDMA), frequency division multiple access (FDMA), time division multiple access (TDMA), orthogonal frequency division multiple access (OFDMA), and single carrier frequency division multiple access (SC-FDMA).

The electronic device 200 may include a transmitter 210 and a communication processor 220.

The transmitter 210 may transmit an RF signal to the base station 100 through the uplink channel 400. The transmitter 210 may receive an RF signal from the base station 100 through the downlink channel 300.

The transmitter 210 may include a plurality of antennas. The transmitter 210 may transmit and receive an RF signal by using at least one of the plurality of antennas. The transmitter 210 may output transmit power to at least one antenna so that an RF signal is transmitted through the at least one antenna.

The communication processor 220 may adjust transmit power of the transmitter 210. In other words, the communication processor 220 may adjust the transmit power of the transmitter 210 so that a desired RF signal is finally output through one or more antennas. In an embodiment, the communication processor 220 may directly adjust the transmit power of the transmitter 210, and in another embodiment, the communication processor 220 may adjust the transmit power of the transmitter 210 through a separate power management integrated circuit (PMIC).

The communication processor 220 may be implemented through a processor, a numeric processing unit (NPU), a graphics processing unit (GPU), or the like.

The communication processor 220 may set transmit limit power (i.e., transmit power limit) of the transmitter 210. The communication processor 220 may control the transmitter 210 to transmit an RF signal with transmit power equal to or less than the transmit limit power.

Transmit power of the transmitter 210 may be adjusted by an uplink transmit power control (TPC) command transmitted from the base station 100 to the electronic device 200 through the downlink channel 300. For example, in order to maintain a signal-to-interference ratio (SIR) of an RF signal received from the electronic device 200 at a target level, the base station 100 may transmit the TPC command to the electronic device 200 based on an estimated SIR. The electronic device 200 may adjust transmit power of RF signals transmitted to the base station 100 through the uplink channel 400 based on the TPC command received through the communication processor 220.

Transmit power of the transmitter 210 may be related to energy radiated from the electronic device 200. In other words, strong electromagnetic waves may be generated in the electronic device 200 by RF signals generated with high transmit power, and the electromagnetic waves may have a harmful effect on users. A harmful effect of such electromagnetic waves on a user may be measured through a specific absorption rate (SAR) value or a power density (PD) value. In addition, the SAR value and the PD value measured when the electronic device transmits the RF signal may be limited through a regulation condition for a total exposure ratio (TER) value, and the TER value regulation condition may be as shown in Mathematical Formula 1 below.

$$TER = \sum_{n=0}^{N-1} \frac{SAR_{avr,n}}{SAR_{limit}} + \sum_{m=0}^{M-1} \frac{PD_{avr,m}}{PD_{limit}} < 1 \quad \text{[Mathematical Formula 1]}$$

In Mathematical Formula 1, $SAR_{limit}$ may indicate a limit of the SAR value determined by an accredited institution, $SAR_{avr,n}$ may indicate an average value of SAR values in a $n^{th}$ measurement interval, $PD_{limit}$ may indicate a limit of PD values determined by the accredited institution, and $PD_{avr,m}$ may indicate an average value of PD values in an $m^{th}$ measurement interval.

The SAR value and the PD value may be calculated through commonly known formulas. In this case, the SAR value and the PD value may be proportional to the transmit power of the electronic device 200. Because the TER value is calculated as the sum of the SAR value and the PD value, the TER value may be proportional to the transmit power of the electronic device 200. Therefore, by increasing or decreasing the transmit power of the electronic device 200, the TER value measured when the electronic device 200 transmits an RF signal may be increased or decreased.

In order to satisfy the TER value regulation condition as in the mathematical formula described above, the communication processor 220 of the electronic device 200 according to an embodiment may calculate a TER value of each of a plurality of antennas and set power of one or more used antennas from among the plurality of antennas. In more detail, the communication processor 220 may store a used antenna index, which is an index of one or more used antennas from among a plurality of antennas used in each window, store used power of an antenna corresponding to the used antenna index, and calculate a TER value based on the used antenna index, the used power, and an influence matrix. Furthermore, the communication processor 220 may calculate a transmit limiting power of one or more used antennas in a setting target window based on the TER value and set transmit power of the one or more used antennas based on the transmit limit power of the one or more used antennas.

A more detailed operation of the communication processor 220 is described below with reference to FIG. 3.

Figure 2:
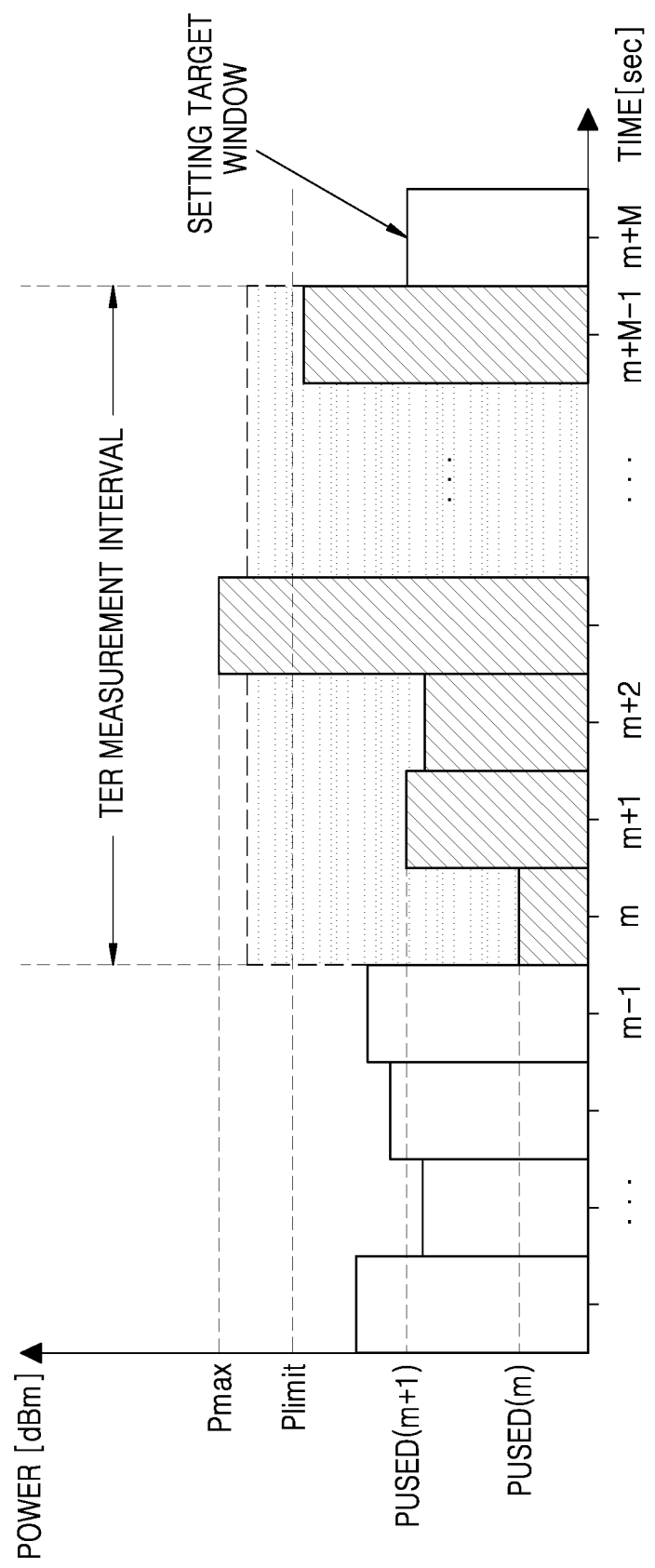
FIG. 2 is a diagram for describing a TER measurement interval of an electronic device according to an embodiment.

FIG. 2 is a diagram for describing a TER measurement interval of an electronic device according to an embodiment.

FIG. 2 is a histogram graph showing a result of measuring used power over time may be identified. In the graph of FIG. 2, the horizontal axis may represent time, the vertical axis may represent used power, and each interval may correspond to one window.

A window may be a unit having a preset length of time, and for example, one window may have a length of time of 250 milliseconds. One window may be divided into N slots. A slot may represent a time unit for transmitting a plurality of communication symbols. In an embodiment, the communication processor 220 may measure transmit power of the transmitter 210 in units of slots and add the measured transmit power in units of slots to obtain transmit power in units of windows.

The TER measurement interval may mean a period in which a TER value is measured to determine whether a TER value regulation condition is satisfied. In the embodiment of FIG. 2, the TER measurement interval may include M windows.

The TER measurement interval may be set based on a communication frequency band of the electronic device 200. For example, when the communication frequency band of the electronic device 200 is less than 3 GHz, the TER measurement interval may be 100 seconds and may include 400 windows. In addition, when the communication frequency band of the electronic device 200 is greater than or equal to about 3 GHz and less than about 6 GHz, the TER measurement interval may be 60 seconds and may include 240 windows. In addition, when the communication frequency band of the electronic device 200 is 6 GHz or higher, the TER measurement interval may be 4 seconds and may include 16 windows.

In an embodiment, because a TER value is proportional to the transmit power of the electronic device 200, the electronic device 200 may calculate the TER value during a TER measurement interval based on used power during the TER measurement interval. In addition, the electronic device 200 may calculate transmit limit power of a setting target window based on the calculated TER value and set transmit power of the setting target window based on the transmit limit power of the setting target window.

The setting target window is a window for which transmit power is to be set based on a TER value of a TER measurement interval, and may be a window immediately following windows included in the TER measurement interval. In the embodiment of FIG. 2, when the TER measurement interval includes a total of M windows from a time point t=m to a time point t=m+M−1, the setting target window is the window at a time point t=m+M.

Figure 3:
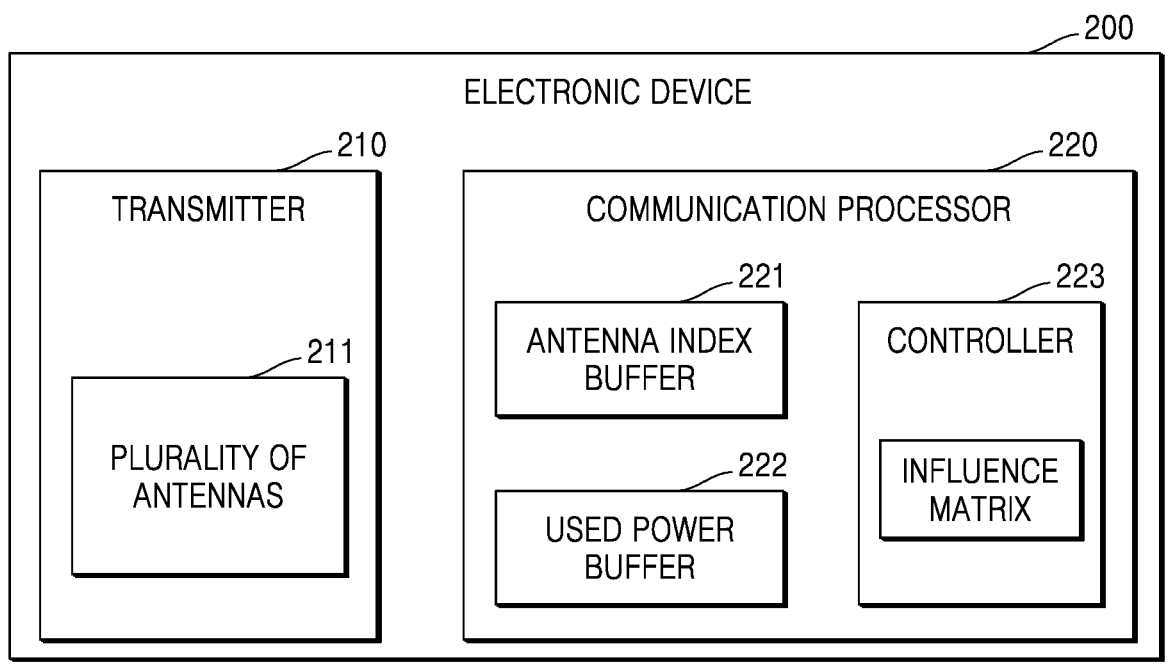
FIG. 3 is a block diagram of an electronic device according to an embodiment.

FIG. 3 is a block diagram of an electronic device according to an embodiment.

Referring to FIG. 3, an electronic device 200 according to an embodiment may include a transmitter 210 and a communication processor 220.

The transmitter 210 may include a plurality of antennas 211. The transmitter 210 may transmit and receive an RF signal by using at least one of the plurality of antennas 211.

Each of the plurality of antennas 211 may transmit an RF signal to the base station 100 through the uplink channel 400. Each of the plurality of antennas 211 may receive an RF signal from the base station 100 through the downlink channel 300.

At least one of the plurality of antennas 211 may receive an input of transmit power from the transmitter 210 and transmit an RF signal by using the received transmit power.

Figure 4:
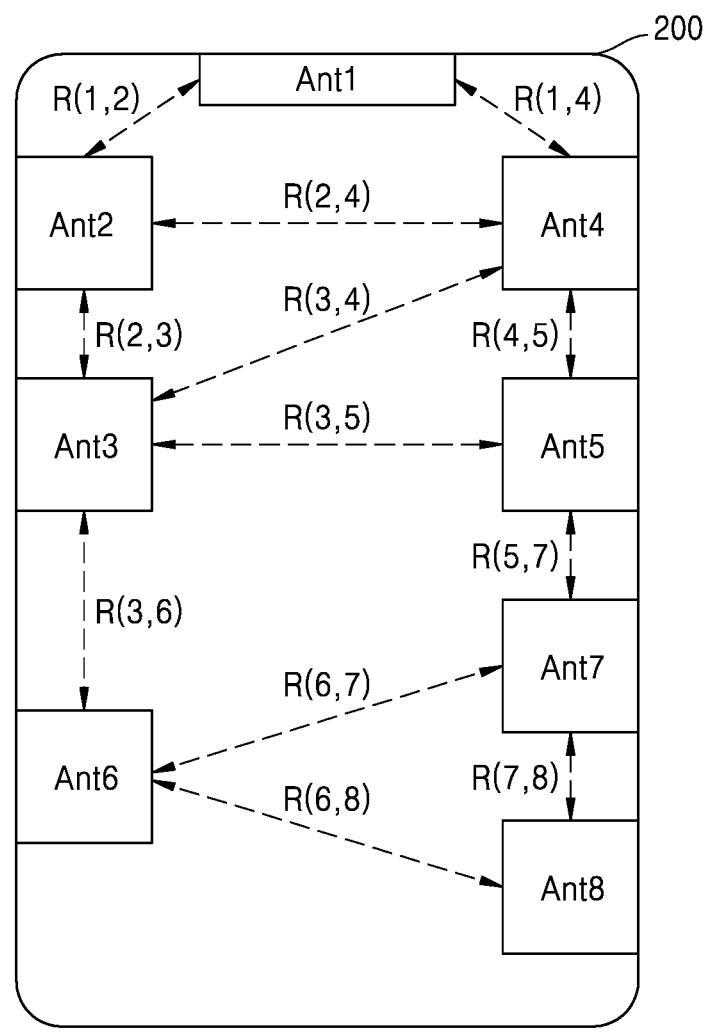
FIG. 4 is a block diagram of an arrangement of a plurality of antennas included in an electronic device according to an embodiment.

An example of an arrangement of the plurality of antennas 211 within the electronic device 200 may be identified with reference to FIG. 4.

FIG. 4 is a diagram illustrating an arrangement of a plurality of antennas included in an electronic device according to an embodiment.

Referring to FIG. 4, an example of the arrangement of the plurality of antennas 211 included in the electronic device 200 according to an embodiment may be identified. FIG. 4 shows an embodiment in which a total of eight antennas are included in the electronic device. However, the inventive concept is not limited thereto, and the number and locations of the plurality of antennas 211 may be adjusted depending on the embodiment.

In the embodiment of FIG. 4, a first antenna Ant1 may be located on the top side of the electronic device 200. In the embodiment of FIG. 4, a second antenna Ant2, a third antenna Ant3, and a sixth antenna Ant6 may be located on the left side of the electronic device 200. In the embodiment of FIG. 4, a fourth antenna Ant4, a fifth antenna Ant5, a seventh antenna Ant7, and an eighth antenna Ant8 may be located on the right side of the electronic device 200.

At this time, the TER value regulation condition, such as Mathematical Formula 1, must be satisfied for each of the antennas. When determining whether the TER value regulation condition is satisfied based on the first antenna Ant1, it is necessary to determine whether the TER value regulation condition is satisfied by considering both a TER value due to exposure caused by RF signal transmission of the first antenna Ant1 and a TER value considering a degree of influence of exposure caused by RF signal transmission of the second to eighth antennas Ant2 to Ant8. At this time, a degree of influence of exposure caused by RF signal transmission of an $i^{th}$ antenna Anti on a $j^{th}$ antenna Antj may be expressed by an influence coefficient, such as R(i, j) (where i and j are different natural numbers less than or equal to 8 and greater than 0). For example, a degree of influence of exposure caused by RF signal transmission of the first antenna Ant1 on the second antenna Ant2 may be expressed by an influence coefficient, such as R(1, 2).

At this time, a degree of influence of exposure caused by the RF signal transmission of the first antenna Ant1 on the second antenna Ant2 may be equal to a degree of influence of exposure caused by the RF signal transmission of the second antenna Ant2 on the first antenna Ant1. In other words, R(1, 2) may have the same value as R(2, 1). Accordingly, R(i, j) may be referred to as an influence coefficient between the $i^{th}$ antenna Anti and the $j^{th}$ antenna Antj.

Although in FIG. 4 some of the influence coefficients between the plurality of antennas 211 are indicated by using dashed arrows, this does not indicate all the influence coefficients and influence coefficients between the plurality of antennas not connected by the dashed arrows may be present.

Returning to FIG. 3, the communication processor 220 may include an antenna index buffer 221, a used power buffer 222, and a controller 223.

The antenna index buffer 221 may store a used antenna index, which is an index of one or more used antennas from among a plurality of antennas 211 used in each window.

A used antenna may refer to an antenna used for transmitting an RF signal. The communication processor 220 may store a used antenna index corresponding to each window in the antenna index buffer 221. In some embodiments, each of the plurality of antennas 211 may have a unique identifier to be distinguished from other antennas. Such a unique identifier may be referred to as an antenna index.

The used power buffer 222 may store used power of an antenna corresponding to the used antenna index. The communication processor 220 may store power consumed by the antenna corresponding to the used antenna index stored in the antenna index buffer 221, in the used power buffer 222 as the used power. The used power may be obtained by receiving the transmit power of one or more used antennas in the previous window from the controller.

Figure 5:
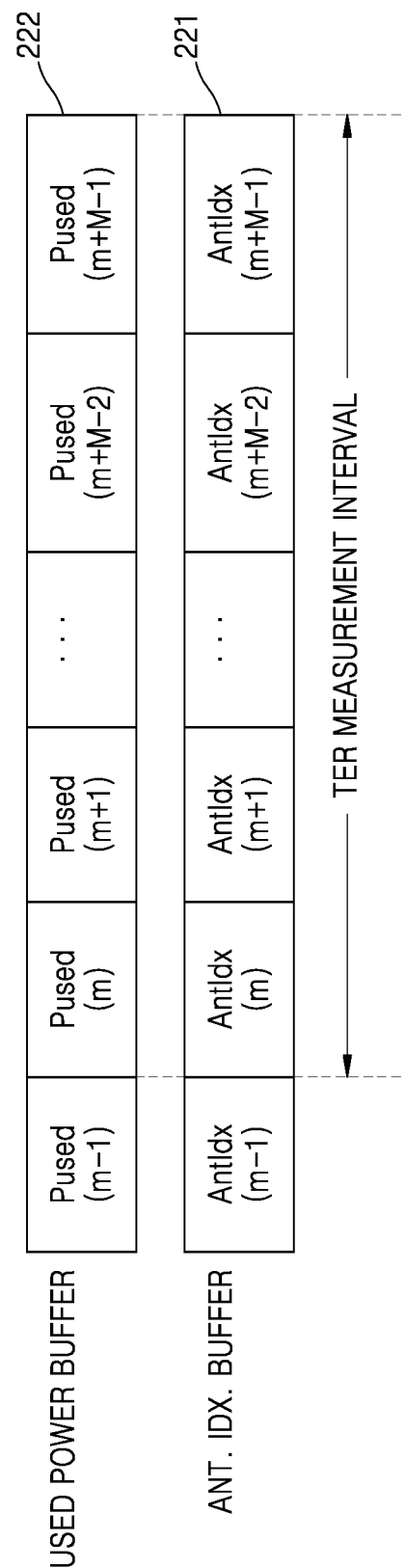
FIG. 5 is a diagram illustrating an antenna index buffer and a used power buffer of an electronic device according to an embodiment.

An example of the antenna index buffer 221 and the used power buffer 222 may be identified with reference to FIG. 5.

FIG. 5 is a diagram illustrating an antenna index buffer and a used power buffer according to an embodiment.

Referring to FIG. 5, it may be identified that the used power buffer 222 is shown at the top and the antenna index buffer 221 is shown at the bottom.

In each region of the antenna index buffer 221, a used antenna index of the corresponding window may be stored. For example, in a region indicated by AntIdx(m), a used antenna index of a window corresponding to a time point t=m may be stored, and in a region indicated by AntIdx(m+M−1), a used antenna index of a window corresponding to a time point t=m+M−1 may be stored.

When there are a plurality of used antennas in a window of a specific time point, a plurality of used antenna indices may be respectively stored in a plurality of antenna index buffers.

In each region of the used power buffer 222, used power of a used antenna in the corresponding window may be stored. For example, in a region marked Pused(m), used power of the used antenna in the window corresponding to a time point t=m may be stored, and in a region marked Pused(m+M−1), used power of the used antenna in the window corresponding to a time point t=m+M−1 may be stored.

In this case, the used power stored in regions of the used power buffer 222 may respectively correspond to the used antenna index stored in the antenna index buffer 221. For example, used power of a used antenna corresponding to the used antenna index stored in an AntIdx(m) region of the antenna index buffer 221 may be stored in a Pused(m) region of the used power buffer 222.

When there are a plurality of used antennas in a window of a specific time point, pieces of used power of the plurality of used antennas may be respectively stored in a plurality of used power buffers.

Returning to FIG. 3, the controller 223 may control the overall operation of the communication processor 220.

The controller 223 may calculate a TER value based on a used antenna index, used power, and an influence matrix. At this time, the controller 223 may read a used antenna index stored in the antenna index buffer 221, and read used power stored in the used power buffer 222, and use the read power to calculate a TER value.

The influence matrix may be a matrix storing the influence coefficient described with reference to FIG. 4. At this time, a degree of exposure caused by RF signal transmission of the $i^{th}$ antenna Anti on the $j^{th}$ antenna Antj is equal to a degree of exposure caused by RF signal transmission of the $j^{th}$ antenna Antj on the $i^{th}$ antenna Anti, and thus, the influence matrix may be a symmetric matrix. In some embodiments, diagonal elements of the influence matrix may be zero.

In an embodiment, the influence matrix may be calculated in advance based on at least one of a correlation between the plurality of antennas 211, an electromagnetic wave emission direction of the plurality of antennas 211, an electromagnetic wave emission amount of the plurality of antennas 211, a state of the electronic device 200, and a distance between the plurality of antennas 211. The correlation between the plurality of antennas 211 may be a correlation coefficient indicating independence between the plurality of antennas 211. For example, the smaller the correlation between the plurality of antennas 211, the more independent the plurality of antennas 211 are of each other.

At this time, the state of the electronic device 200 may mean an influence by restrictions on the use of the plurality of antennas 211 due to other operations, used power of the electronic device 200, and the like. For example, when the electronic device 200 performs another operation, such as using a camera, the use of a plurality of antennas 211 may be restricted. In another example, when the power consumption of the electronic device 200 increases as the electronic device 200 performs other operations, such as processing a large amount of calculations, the use of a plurality of antennas 211 may be restricted. When the use of a plurality of antennas 211 may be restricted as in the above-mentioned example, the state of the electronic device 200 may be such that one or more antennas among the plurality of antennas 211 are unusable. At this time, the correlation between the plurality of antennas 211, the electromagnetic wave emission direction of the plurality of antennas 211, the electromagnetic wave emission amount of the plurality of antennas 211, and the distance between the plurality of antennas 211 may be determined at the time of manufacture and may not change, but the state of the electronic device 200 may continuously change according to an operation of the electronic device 200.

In an embodiment, the controller 233 may store an influence matrix group including a plurality of influence matrices corresponding to states of the electronic device 200. In this case, the controller 223 may select one influence matrix from the influence matrix group based on the state of the electronic device 200 and calculate a TER value based on the selected influence matrix.

In an embodiment, the controller 223 may calculate the TER value based on the $i^{th}$ antenna in the window corresponding to the time point t=m in the following order. First, the controller 223 may read a used antenna index of the window corresponding to the time point t=m from the antenna index buffer 221. Second, the controller 223 may read used power of a used antenna of the window corresponding to the time point t=m from the used power buffer 222. Third, the controller 223 may obtain an influence coefficient between the used antenna of the window corresponding to the time point t=m and the $i^{th}$ antenna in a convergence influence matrix. Finally, the controller 223 may calculate a TER value by using a value obtained by multiplying the used power read in the second step by the influence coefficient obtained in the third step.

In an embodiment, when the electronic device 200 performs communication using one communication network and a plurality of used antennas are used, the controller 223 may calculate a convergence influence matrix based on the plurality of used antennas and an influence matrix.

The communication network is a network for communication between the base station 100 and the electronic device 200, between base stations 100, or between electronic devices 200, and may be a network using 5G (or New Radio (NR)), Long Term Evolution (LTE), Long Term Evolution-Advanced (LTE-A), WiMAX, WiFi, CDMA, global system for mobile communications (GSM), a wireless local area network (WLAN), or any other wireless communication technology.

In other words, when the electronic device 200 performs communication through one communication network using two or more antennas from among a plurality of antennas, the controller 223 may calculate a convergence influence matrix.

The convergence influence matrix is a matrix generated by simplifying an influence matrix, and may represent only a relationship between a plurality of used antennas. At this time, the convergence influence matrix may be calculated as shown in Mathematical Formula 2 below.

$$R_{conv}(i,j)=\max(R(i,j),R(k,i)+R(k,j)-1) \quad \text{[Mathematical Formula 2]}$$

Here, $R_{conv}(i, j)$ indicates a component (i.e., an element) of the convergence influence matrix, and i and j may correspond to indices of antennas in use. In addition, R(i, j), R(k, i), and R (k, j) may indicate influence coefficients that are elements of the influence matrix. For example, R (i, j) represents a degree of influence of exposure caused by an RF signal transmission of an $i^{th}$ antenna on a $j^{th}$ antenna, and i and j are integer numbers equal to or less than a number of the plurality of antennas 211. R (k, i) represents a degree of influence of exposure caused by an RF signal transmission of a kth antenna on an $i^{th}$ antenna, and k is an integer number equal to or less than the number of the plurality of antennas 211. R (k, j) represents a degree of influence of exposure caused by an RF signal transmission of the kth antenna on the $j^{th}$ antenna.

The controller 223 may calculate TER values of a plurality of used antennas based on the calculated convergence influence matrix. In this case, a method for the controller 223 to calculate a TER value of a plurality of used antennas based on a convergence influence matrix may be the same as a method of calculating TER values of a plurality of used antennas based on an influence matrix.

In an embodiment, when the electronic device 200 performs communication using a plurality of communication networks and a plurality of antennas are used, the controller 223 may calculate a convergence influence matrix based on the plurality of used antennas and the influence matrix. In addition, the controller 223 may adjust the convergence influence matrix based on an antenna coefficient of each of the plurality of used antennas. The antenna coefficient may be a coefficient that indicates a degree of influence of exposure caused by RF signal transmission of one of the plurality of used antennas on the other plurality of used antennas. The controller 223 may increase values of components (i.e., elements) of the convergence influence matrix based on the antenna coefficient of each of the plurality of used antennas. For example, when the antenna coefficient of a specific used antenna is more than a preset reference value (e.g., 0.5), the controller 223 may increase values of components of the convergence influence matrix associated with the specific used antenna.

The controller 223 may calculate TER values of a plurality of used antennas based on the adjusted convergence influence matrix. In this case, a method for the controller 223 to calculate a TER value of the plurality of used antennas based on the adjusted convergence influence matrix may be the same as a method of calculating TER values of the plurality of used antennas based on the influence matrix.

The controller 223 may calculate TER values of the plurality of used antennas, and then calculate transmit limit power of one or more used antennas in a setting target window based on the TER values.

In more detail, the controller 223 may calculate a residual TER value indicating how less the TER value is used during a TER measurement interval based on the calculated TER value. The controller 223 may calculate an available TER value, which is a limit of TER values usable in a setting target window, based on the residual TER value. The controller 223 may calculate transmit limit power of the used antenna based on the available TER value.

In this case, when the electronic device 200 has a plurality of used antennas, the controller 223 may calculate transmit limit power of the plurality of used antennas in the setting target window based on TER values of the plurality of used antennas. In other words, when there are a plurality of used antennas, the controller 223 may calculate transmit limit power of each of the plurality of used antennas.

In an embodiment, when the electronic device 200 performs communication using one communication network and has only one used antenna, the controller 223 may compare the transmit limit power of the used antenna to maximum required power for transmitting an RF signal in the setting target window. When the transmit limit power of the used antenna is less than the maximum required power in the setting target window, the controller 223 may calculate transmit limit power of an unused antenna from among the plurality of antennas. Furthermore, the controller 223 may determine a change of the used antenna based on the transmit limit power of the unused antenna and maximum required power (i.e., may determine whether to replace the used antenna with the unused antenna based on the transmit limit power of the unused antenna and maximum required power).

The controller 223 may change the unused antenna to a used antenna (i.e., may set the unused antenna as a new used antenna to be used in the setting target window) when the transmit limit power of the unused antenna is equal to or greater than the maximum required power. Conversely, when the transmission limit power of the unused antenna is less than the maximum required power, the used antenna may not be changed (i.e., may be kept for use in the setting target window).

In this way, in a case in which the electronic device 200 performs communication using one communication network and has one used antenna, when an RF signal cannot be transmitted with the maximum required power and communication quality deteriorates, the electronic device 200 may change the used antenna to improve communication quality, when the signal may be transmitted with the maximum transmit power.

The controller 223 may set transmit power of one or more used antennas based on transmit limit power of the one or more used antennas.

In this case, when the electronic device 200 has a plurality of used antennas, the controller 223 may set transmit power of the plurality of used antennas based on transmit limit power of the plurality of used antennas. In other words, when there are a plurality of used antennas, the controller 223 may calculate transmit power of each of the plurality of used antennas.

When the electronic device 200 according to the inventive concept as described above is used, by calculating a TER value based on a used antenna index, used power, and an influence matrix, optimal communication performance may be secured while satisfying the TER value regulation condition.

Figure 6:
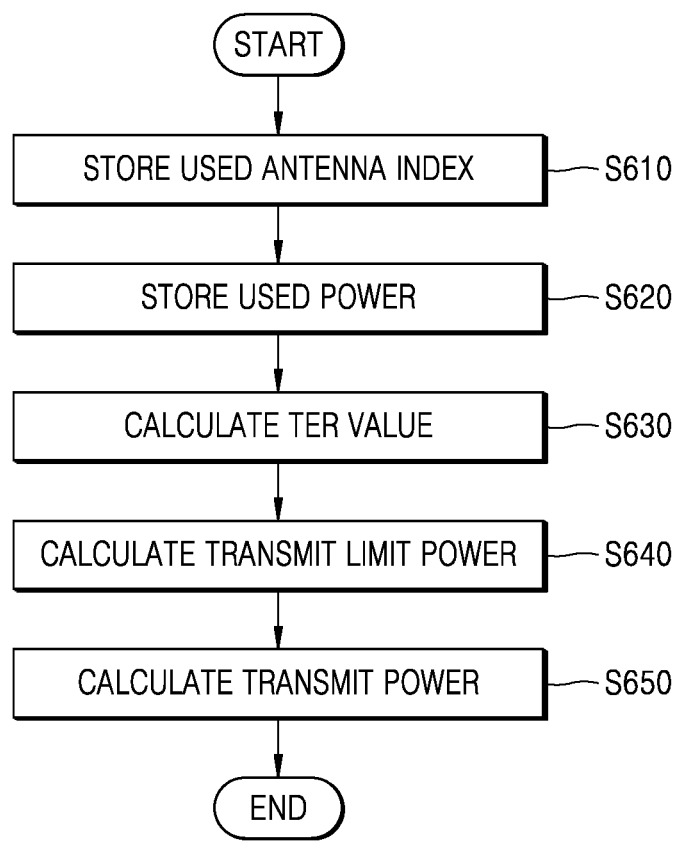
FIG. 6 is a flowchart of a method of operating an electronic device, according to an embodiment.

FIG. 6 is a flowchart of a method of operating an electronic device, according to an embodiment.

Referring to FIG. 6, in operation S610, the electronic device 200 may store a used antenna index in the antenna index buffer 221. The electronic device 200 may store, in the antenna index buffer 221, used antenna indices of a plurality of windows included in a TER measurement interval.

In operation S620, the electronic device 200 may store used power in the used power buffer 222. The electronic device 200 may store, in the used power buffer 222, used power of used antennas of a plurality of windows included in the TER measurement interval. At this time, the used power stored in the used power buffer 222 may correspond to the used antenna index stored in the antenna index buffer 221.

In operation S630, the electronic device 200 may calculate a TER value. The electronic device 200 may calculate the TER value based on the used antenna index, the used power, and an influence matrix. A detailed method of calculating the TER value by the electronic device 200 may be described with reference to FIG. 7.

Figure 7:
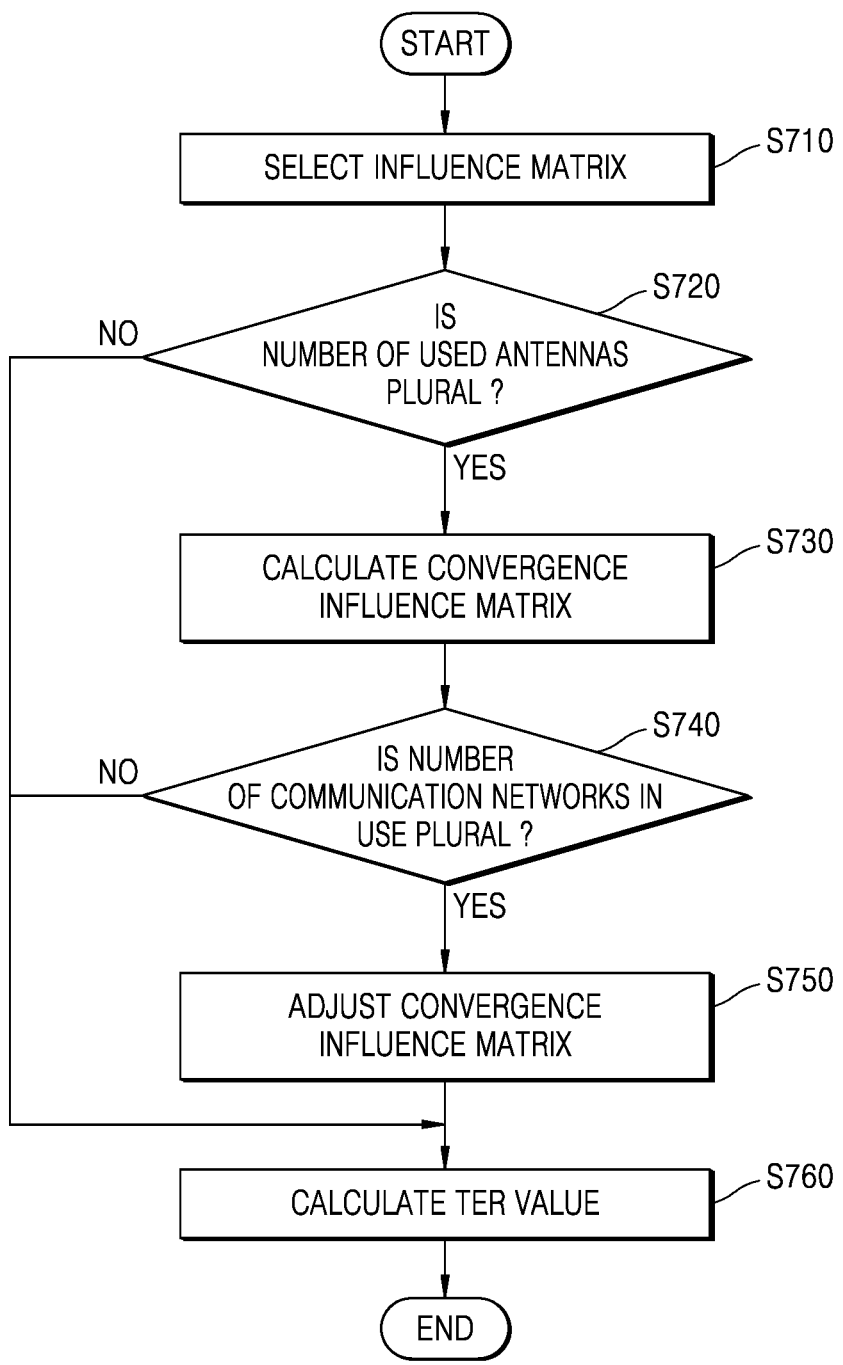
FIG. 7 is a flowchart of a method of calculating a TER value of an electronic device, according to an embodiment.

FIG. 7 is a flowchart of a method of calculating a TER value by an electronic device, according to an embodiment.

Referring to FIG. 7, in operation S710, the electronic device 200 may select an influence matrix. The electronic device 200 may select one influence matrix from an influence matrix group based on a state of the electronic device 200 through the controller 223.

In operation S720, the electronic device may determine whether there are a plurality of used antennas. At this time, when there is only one used antenna, the process may proceed directly to operation S760.

When there are a plurality of used antennas, the electronic device 200 may calculate a convergence influence matrix, in operation S730.

In operation S740, the electronic device 200 may determine whether a plurality of communication networks are in use. At this time, when there is only one communication network in use, the method may proceed directly to operation S760.

When a plurality of communication networks are in use, the electronic device 200 may adjust the convergence influence matrix, in operation S750.

In operation S760, the electronic device 200 may calculate a TER value.

At this time, when the method proceeds from operation S720 to operation S760, the electronic device 200 may calculate the TER value based on a used antenna index, used power, and the influence matrix through the controller 223. In addition, when the method proceeds from operation S740 to operation S760, the electronic device 200 may calculate the TER value based on the used antenna index, the used power, and the convergence influence matrix through the controller 223. Finally, when the method proceeds from operation S750 to operation S760, the electronic device 200 may calculate the TER value based on the used antenna index, the used power, and the adjusted convergence influence matrix through the controller 223.

Returning to FIG. 6, in operation S640, the electronic device 200 may calculate transmit limit power. The electronic device 200 may calculate a residual TER value based on the TER value calculated through the controller 223, calculate an available TER value based on the residual TER value, and calculate a transmit limit power of a used antenna based on the available TER value.

In operation S650, the electronic device 200 may calculate transmit power. The electronic device 200 may calculate the transmit power based on the transmit limit power calculated through the controller 223.

When the method of operating the electronic device 200, according to the inventive concept as described above, is used by calculating a TER value based on a used antenna index, used power, and an influence matrix, optimal communication performance may be secured while satisfying the TER value regulation condition.

Figure 8:
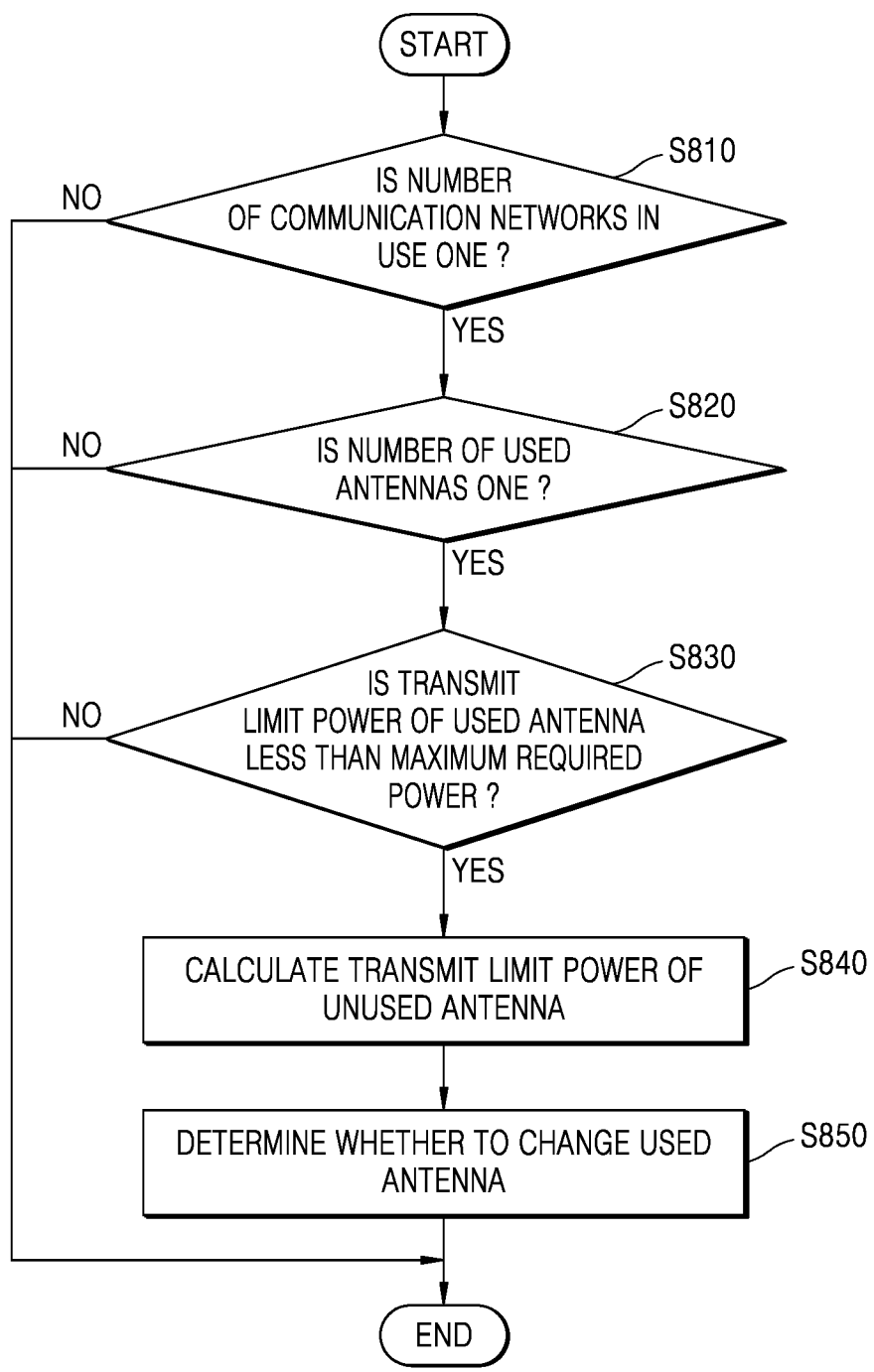
FIG. 8 is a flowchart of an operating method when an electronic device performs communication using one communication network and one used antenna, according to an embodiment.

FIG. 8 is a flowchart of a method of operating an electronic device communicating using one communication network and one used antenna, according to an embodiment.

Referring to FIG. 8, a flowchart of an embodiment that may be selectively applied after calculating the transmit limit power of the used antenna, in operation S640 of FIG. 6, may be identified.

In operation S810, the electronic device 200 may determine whether there is one communication network in use.

When there are a plurality of communication networks in use, the electronic device 200 may terminate the operation thereof without proceeding with a subsequent operation related to changing a used antenna.

When there is one communication network in use, the electronic device 200 may determine whether there is one used antenna, in operation S820.

When the number of used antennas is plural, the electronic device 200 may terminate the operation thereof without proceeding with a subsequent operation related to changing a used antenna.

When there is one used antenna, in operation S830, the electronic device 200 may determine whether the transmit limit power of the used antenna is less than the maximum required power.

When the transmit limit power of the used antenna is greater than or equal to the maximum required power, the RF signal may be transmitted with the highest communication quality even without changing the used antenna, and thus, the operation may be terminated without proceeding with an additional operation.

When the transmit limit power of the used antenna is less than the maximum required power, the electronic device 200 may calculate transmit limit power of an unused antenna, in operation S840.

In operation S850, the electronic device 200 may determine whether to change the used antenna. A method for the electronic device 200 to determine whether to change the used antenna through the controller 223 may be described in more detail with reference to FIG. 9.

Figure 9:
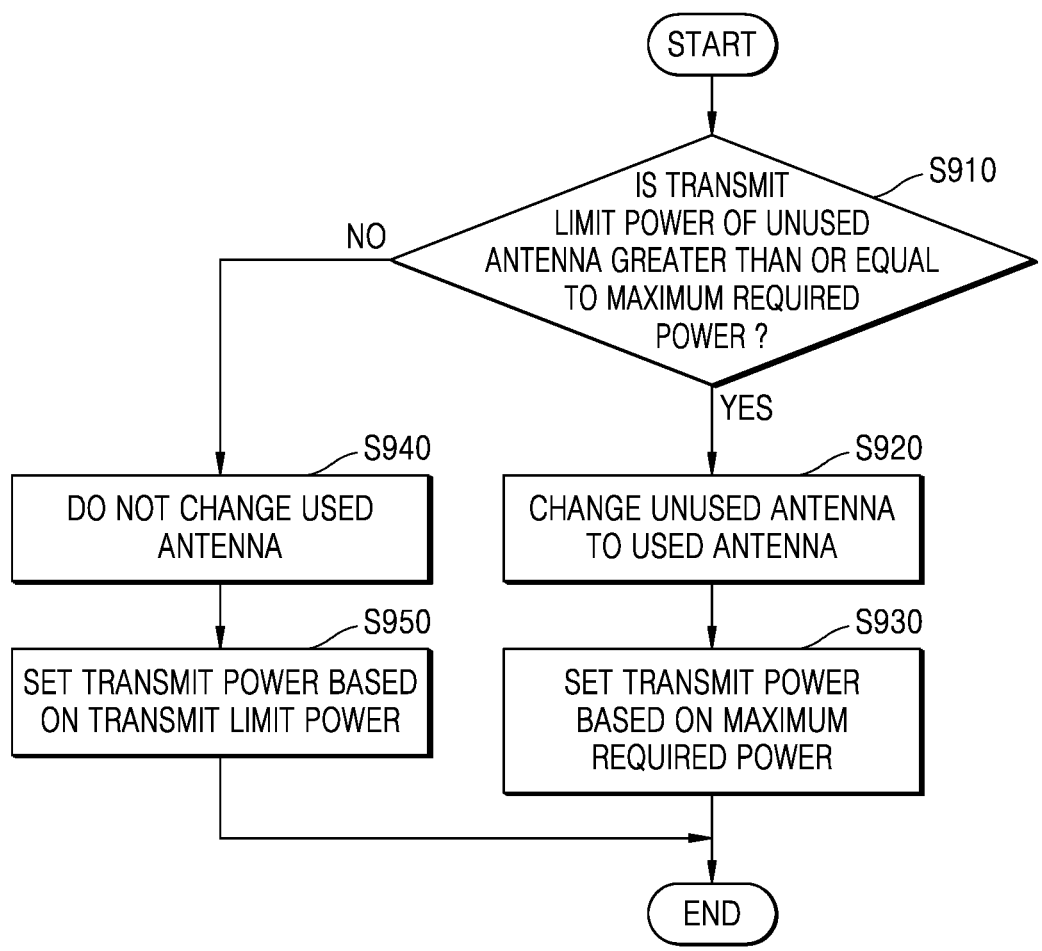
FIG. 9 is a flowchart of a method of determining whether to change a used antenna when an electronic device performs communication using one communication network and includes one used antenna, and a method of setting transmit power accordingly, according to an embodiment.

FIG. 9 is a flowchart of a method of determining, when an electronic device performs communication using one communication network and has one used antenna, whether to change the used antenna, according to an embodiment, and a method of setting transmit power accordingly.

Referring to FIG. 9, in operation S910, the electronic device 200 may determine whether transmit limit power of an unused antenna is greater than or equal to maximum required power.

When the transmit limit power of the unused antenna is greater than or equal to the maximum required power, the electronic device 200 may change the unused antenna to a used antenna, in operation S920. In addition, in operation S930, the electronic device 200 may set transmit power based on the maximum required power. In this way, because an antenna newly set as a used antenna may transmit an RF signal by using the maximum required power, the electronic device 200 may determine to change the used antenna and set transmit power based on the maximum required power, thereby improving communication quality.

Conversely, when the transmit limit power of the unused antenna is less than the maximum required power, the electronic device 200 may not change the used antenna (i.e., may keep the used antenna for use in the setting target window), in operation S940. In addition, in operation S950, the electronic device 200 may set transmit power based on the transmit limit power. In other words, because the electronic device 200 needs to transmit an RF signal by using an existing antenna, transmit power may be set based on the transmit limit power of the existing antenna.

Figure 10:
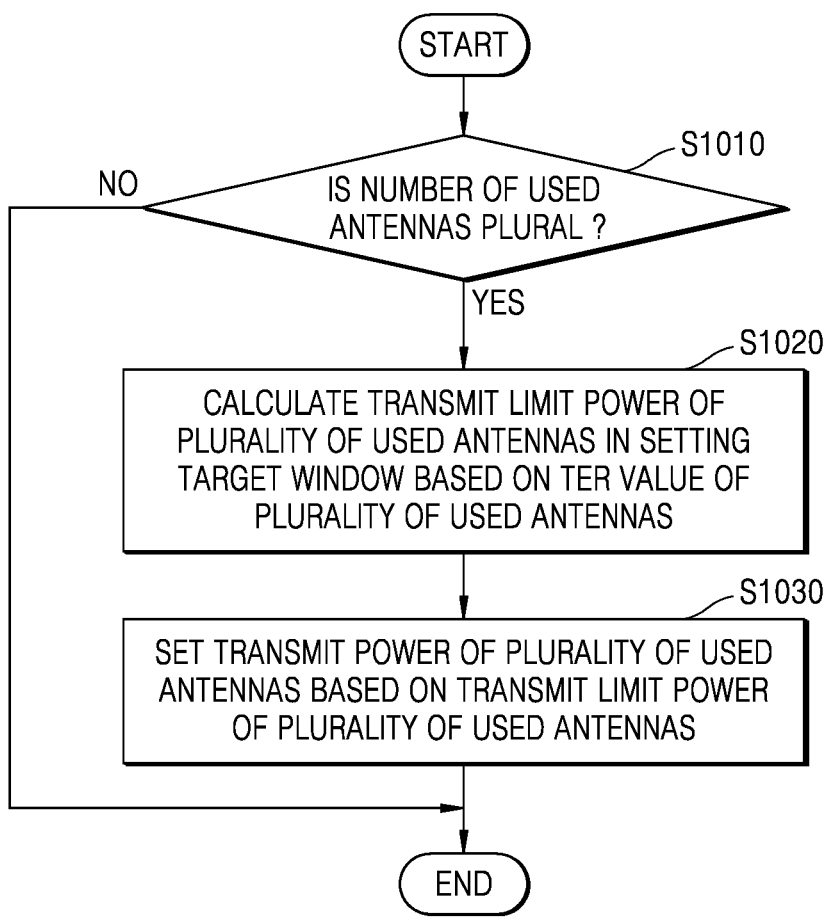
FIG. 10 is a flowchart of a transmit limit power calculation method and a transmit power setting method when an electronic device includes a plurality of used antennas, according to an embodiment.

FIG. 10 is a flowchart of a transmit limit power calculation method and a transmit power setting method when an electronic device has a plurality of used antenna, according to an embodiment.

Referring to FIG. 10, in operation S1010, the electronic device 200 may determine whether there are a plurality of used antennas.

When there is one used antenna, transmit limit power may be calculated in the same manner as described above and transmit power may be set.

When there are a plurality of used antennas, in operation S1020, the electronic device 200 may calculate transmit limit power of the plurality of used antennas in a setting target window based on TER values of the plurality of used antennas. In other words, when there are a plurality of used antennas, the electronic device 200 may calculate all transmit limit power of each of the plurality of used antennas through the controller 223.

Next, in operation 51030, the electronic device 200 may calculate transmit power of the plurality of used antennas based on the transmit limit power of the plurality of used antennas. In other words, when there are a plurality of used antennas, the electronic device 200 may calculate transmit power of each of the plurality of used antennas through the controller 223.

Figure 11:
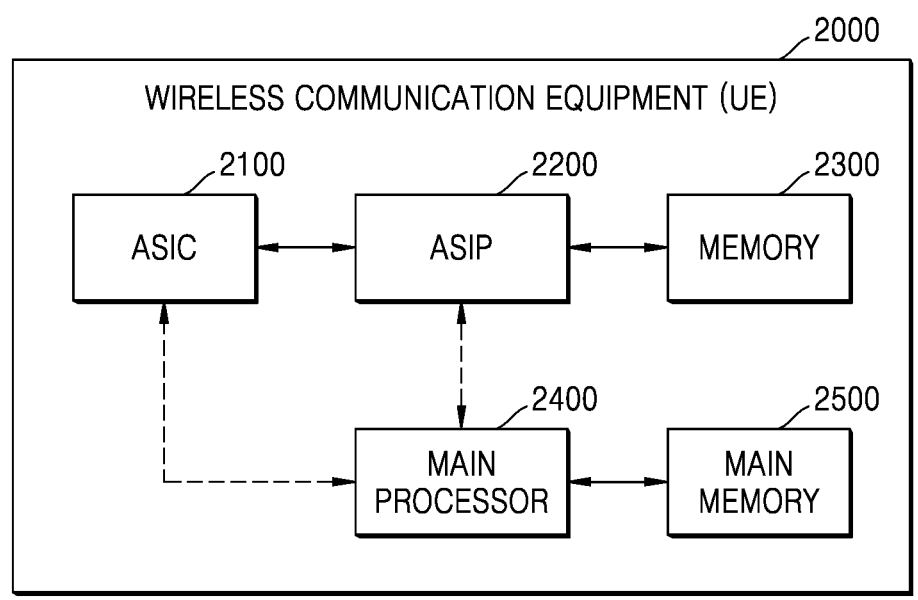
FIG. 11 is a block diagram of a wireless communication device according to an embodiment.

FIG. 11 is a block diagram of wireless communication equipment according to an embodiment.

Referring to FIG. 11, wireless communication equipment 2000 may include an application specific integrated circuit (ASIC) 2100, an application specific instruction set processor (ASIP) 2200, a memory 2300, a main processor 2400, and a main memory 2500. Two or more of the ASIC 2100, the ASIP 2200, and the main processor 2400 may communicate with each other. In addition, at least two of the ASIC 2100, the ASIP 2200, the memory 2300, the main processor 2400, and the main memory 2500 may be embedded in one chip.

The ASIC 2100 is an integrated circuit customized for a specific purpose, and may include, for example, a radio-frequency integrated circuit (RFIC), a modulator, a demodulator, and the like. The ASIP 2200 may support a dedicated instruction set for a specific application and may execute instructions included in the instruction set. The memory 2300 may communicate with the ASIP 2200 and may store, as a non-temporary storage device, a plurality of instructions to be executed by the ASIP 2200. For example, the memory 2300 may include any type of memory accessible by the ASIP 2200, such as random access memory (RAM), read only memory (ROM), tape, magnetic disks, optical disks, volatile memory, non-volatile memory, and a combination thereof.

The main processor 2400 may control a wireless communication equipment 2000 by executing a plurality of instructions. For example, the main processor 2400 may control the ASIC 2100 and the ASIP 2200, may process data received through a wireless communication network, or may process a user's input to the wireless communication equipment 2000. The main memory 2500 may communicate with the main processor 2400 and may store a plurality of instructions executed by the main processor 2400 as a non-temporary storage device. For example, the main memory 2500 may include any type of memory accessible by the main processor 2400, such as RAM, ROM, tape, magnetic disks, optical disks, volatile memory, non-volatile memory, and a combination thereof.

The operation of configuring the elements of the electronic device 200 or the operating method of the electronic device 200, according to the embodiment described above, may be included in at least one of the elements included in the wireless communication equipment 2000 of FIG. 11. For example, the electronic device 200 of FIG. 1 or at least one of the operations of the method of operating the electronic device 200 described above may be implemented as a plurality of instructions stored in the memory 2300, and the ASIP 2200 may execute an operation or the at least one operation of the electronic device 200 by executing the plurality of instructions stored in the memory 2300. As another example, the electronic device 200 of FIG. 1 or at least one of the operations of the method of operating the electronic device 200 described above may be implemented as a hardware block and included in the ASIC 2100. As another example, the electronic device 200 of FIG. 1 or at least one of the method of operating the electronic device 200 may be implemented as a plurality of instructions stored in the main memory 2500, and the main processor 4400 may perform the electronic device 200 or the at least one operation of the method of operating the electronic device 200 described above, by executing the plurality of instructions stored in the main memory 2500.

While the inventive concept has been particularly shown and described with reference to embodiments thereof, it will be understood that various changes in form and details may be made therein without departing from the spirit and scope of the following claims.

What is claimed is:

1. An electronic device comprising:
a transmitter including a plurality of antennas; and
a communication processor configured to calculate a total exposure ratio (TER) value of each of the plurality of antennas,
wherein the communication processor includes:
an antenna index buffer configured to store a used antenna index, which is an index of one or more used antennas from among the plurality of antennas used in each window of a plurality of windows in a TER measurement interval;
a used power buffer configured to store used power of an antenna corresponding to the used antenna index; and
a controller configured to calculate the TER value based on the used antenna index, the used power, and an influence matrix, wherein the influence matrix includes a plurality of influence coefficients R (i, j), each of which represents a degree of influence of exposure caused by a radio frequency (RF) signal transmission of an $i_{th}$ antenna on a $j_{th}$ antenna, and wherein i and j are integer numbers equal to a number of the plurality of antennas.

2. The electronic device of claim 1,
wherein the influence matrix is calculated based on at least one of a correlation between the plurality of antennas, an electromagnetic wave emission direction of the plurality of antennas, an electromagnetic wave emission amount of the plurality of antennas, a state of the electronic device, and a distance between the plurality of antennas.

3. The electronic device of claim 2,
wherein the controller is further configured to:
select the influence matrix from an influence matrix group based on the state of the electronic device; and
calculate the TER value based on the influence matrix.

4. The electronic device of claim 1,
wherein the controller is further configured to:
calculate transmit power limit of the one or more used antennas to be used in a setting target window after the TER measurement interval based on the TER value; and
set transmit power of the one or more used antennas based on the transmit power limit of the one or more used antennas.

5. The electronic device of claim 4,
wherein the controller is further configured to:
in a case in which the electronic device performs communication using one communication network and the number of the one or more used antennas is one, when transmit power limit of one used antenna to be used in the setting target window is less than maximum required power for transmitting an RF signal, calculate transmit power limit of an unused antenna from among the plurality of antennas; and
determine whether to replace the one used antenna with the unused antenna based on the transmit power limit of the unused antenna and the maximum required power.

6. The electronic device of claim 5,
wherein the controller is further configured to:
when the transmit power limit of the unused antenna is greater than or equal to the maximum required power, set the unused antenna as a new used antenna to be used in the setting target window and set transmit power of the new used antenna to be used in the setting target window based on the maximum required power; and
when the transmit power limit of the unused antenna is less than the maximum required power, keep the one used antenna for use in the setting target window and set the transmit power of the one used antenna to be used in the setting target window based on the transmit power limit of the one used antenna.

7. The electronic device of claim 1, wherein the controller is further configured to, when the electronic device performs communication using one communication network and the number of the one or more used antennas is plural, calculate a convergence influence matrix based on the plurality of used antennas and the influence matrix and calculate the TER value of the plurality of used antennas based on the convergence influence matrix.

8. The electronic device of claim 7, wherein the controller is further configured to:
when the electronic device performs communication using one communication network and the number of the one or more used antennas is plural, calculate transmit power limit of the plurality of used antennas to be used in a setting target window based on the TER value of the plurality of used antennas; and
set transmit power of the plurality of used antennas based on the transmit power limit of the plurality of used antennas.

9. The electronic device of claim 1, wherein the controller is further configured to, when the electronic device performs communication using a plurality of communication networks and the number of the one or more used antennas is plural, calculate a convergence influence matrix based on the plurality of used antennas and the influence matrix, adjust the convergence influence matrix based on an antenna coefficient of each of the plurality of used antennas, and calculate the TER value of the plurality of used antennas based on the adjusted convergence influence matrix.

10. The electronic device of claim 1, wherein the controller is further configured to:
when the electronic device performs communication using a plurality of communication networks and the number of the one or more used antennas is one, calculate transmit power limit of one used antenna to be used in a setting target window after the TER measurement interval based on the TER value of the one used antenna; and
set transmit power of the one used antenna based on the transmit power limit of the one used antenna.

11. A method of operating an electronic device, which includes a transmitter including a plurality of antennas, and a communication processor for calculating a total exposure ratio (TER) value of each of the plurality of antennas, the method comprising:
storing a used antenna index, which is an index of one or more used antennas from among the plurality of antennas used in each window of a plurality of windows in a TER measurement interval;
storing used power of an antenna corresponding to the used antenna index;
calculating the TER value based on the used antenna index, the used power, and an influence matrix, wherein the influence matrix includes a plurality of influence coefficients R (i, j), each of which represents a degree of influence of exposure caused by an RF signal transmission of an $i_{th}$ antenna on a $j_{th}$ antenna, and wherein i and j are integer numbers equal to a number of the plurality of antennas;
calculating transmit power limit of the one or more used antennas to be used in a setting target window after the TER measurement interval based on the TER value; and
setting transmit power of the one or more used antennas based on the transmit power limit of the one or more used antennas.

12. The method of claim 11, further comprising:
in a case in which the electronic device performs communication using one communication network and the number of the one or more used antennas is one, when the transmit power limit of one used antenna to be used in the setting target window is less than maximum required power for transmitting an RF signal, calculating transmit power limit of an unused antenna from among the plurality of antennas; and determining whether to replace the one used antenna with the unused antenna based on the transmit power limit of the unused antenna and the maximum required power.

13. The method of claim 12, wherein the determining whether to replace the one used antenna with the unused antenna includes:

when the transmit power limit of the unused antenna is greater than or equal to the maximum required power, setting the unused antenna as a new used antenna to be used in the setting target window; and when the transmit power limit of the unused antenna is less than the maximum required power, keeping the one used antenna for use in the setting target window.

14. The method of claim 13, wherein the setting of the transmit power includes:

when the transmit power limit of the unused antenna is greater than or equal to the maximum required power, setting transmit power of the new used antenna to be used in the setting target window based on the maximum required power; and when the transmit power limit of the unused antenna is less than the maximum required power, setting the transmit power of the one used antenna to be used in the setting target window based on the transmit power limit of the used antenna.

15. The method of claim 11, wherein the calculating of the TER value includes:

when the electronic device performs communication using one communication network and the number of the one or more used antennas is plural, calculating a convergence influence matrix based on the plurality of used antennas and the influence matrix; and calculating the TER value of the plurality of used antennas based on the convergence influence matrix.

16. The method of claim 11, wherein the calculating of the TER value includes:

when the electronic device performs communication using a plurality of communication networks and the number of the one or more used antennas is plural, calculating a convergence influence matrix based on the plurality of used antennas and the influence matrix;

adjusting the convergence influence matrix based on an antenna coefficient of each of the plurality of used antennas; and calculating the TER value of the plurality of used antennas based on the adjusted convergence influence matrix.

17. An electronic device comprising:

a transmitter including a plurality of antennas; and
a communication processor configured to:

calculate a total exposure ratio (TER) value of each of the plurality of antennas; and set transmit power of one or more used antennas from among the plurality of antennas, wherein the communication processor includes:

an antenna index buffer configured to store a used antenna index, which is an index of the one or more used antennas used in each window;

a used power buffer configured to store used power of an antenna corresponding to the used antenna index; and a controller configured to:

calculate the TER value based on the used antenna index, the used power, an influence matrix, and the number of the one or more used antennas, wherein the influence matrix includes a plurality of influence coefficients R (i, j), each of which represents a degree of influence of exposure caused by an RF signal transmission of an $i_{th}$ antenna on a $j_{th}$ antenna, and wherein i and j are integer numbers equal to a number of the plurality of antennas;

calculate transmit limit power of the one or more used antennas to be used in a setting target window based on the TER value; and set the transmit power of the one or more used antennas based on the transmit limit power of the one or more used antennas.

18. The electronic device of claim 17, wherein the controller is further configured to, when the electronic device performs communication using one communication network and the number of the one or more used antennas is one, set transmit power of one used antenna based on transmit power limit of the one used antenna, transmit power limit of an unused antenna from among the plurality of antennas, and maximum required power for transmitting an RF signal.

19. The electronic device of claim 17, wherein the controller is further configured to, when the electronic device performs communication using one communication network and the number of the one or more used antennas is plural, calculate a convergence influence matrix based on the plurality of used antennas and the influence matrix and calculate the TER value of the plurality of used antennas.

20. The electronic device of claim 17, wherein the controller is further configured to, when the electronic device performs communication using a plurality of communication networks and the number of the one or more used antennas is plural, calculate a convergence influence matrix based on the plurality of used antennas and the influence matrix, adjust the convergence influence matrix based on an antenna coefficient of each of the plurality of used antennas, and calculate the TER value of the plurality of used antennas based on the adjusted convergence influence matrix.

* * * * *